United States Patent [19]

Böhm et al.

[11] 3,871,922

[45] Mar. 18, 1975

[54] GAS DIFFUSION ELECTRODE FOR ELECTROCHEMICAL CELLS

[75] Inventors: Harald Böhm, Oberursel; Jochen Heffler, Grossauheim, both of Germany

[73] Assignee: Licentia Patent-Verwaltungs G.m.b.H., Frankfurt am Main, Germany

[22] Filed: July 12, 1972

[21] Appl. No.: 271,157

[30] Foreign Application Priority Data
July 12, 1971 Germany.............................. 2134704
July 12, 1971 Germany.............................. 7126690

[52] U.S. Cl......................... 136/120 FC, 136/86 D
[51] Int. Cl.......................................... H01m 35/00
[58] Field of Search........................ 136/86, 120 FC

[56] References Cited
UNITED STATES PATENTS
2,969,315  1/1961  Bacon ........................ 136/86 R UX
3,188,242  6/1965  Kordesch et al. ................. 136/86 R
3,462,307  8/1969  Voorhees et al. ................. 136/86 A
3,573,122  3/1971  Olstowski et al. .................. 136/121

Primary Examiner—John H. Mack
Assistant Examiner—H. A. Feeley
Attorney, Agent, or Firm—Spencer & Kaye

[57] ABSTRACT

A gas diffusion electrode for an electrochemical cell having an acidic electrolyte, including a metal net, a corrosion-resistant, electrolyte- and gas-impervious, graphite-foam coating on the net, sunken canals on the graphite-foam coating for conducting electrolyte, a porous catalyzing layer conforming with the net and in contact with the graphite-foam coating, and an electrically insulating coating on the graphite-foam coating.

9 Claims, 3 Drawing Figures

GAS DIFFUSION ELECTRODE FOR ELECTROCHEMICAL CELLS

BACKGROUND OF THE INVENTION

The present invention relates to a gas diffusion electrode for electrochemical cells operating with acid electrolyte. More particularly, the present invention relates to such an electrode which is made from a steel foil encase with graphite foam.

The present invention is an improvement of the gas diffusion electrode disclosed in U.S. Pat. application Ser. No. 116,952, filed Feb. 19th, 1971, by Harald Böhm et al for a "Gas Diffusion Electrode." This application will be referred to as Ser. No. 116,952 in the following. Using the electrically conducting graphite frames of such electrodes of Ser. No. 116,952, the electrodes can only be assembled to form batteries having cells electrically connected in parallel. Otherwise, short-circuiting occurs through the electrolyte canal used for circulating electrolyte through the electrolyte chambers.

SUMMARY OF THE INVENTION

An object of the present invention, therefore, is to provide an improved electrode of the type disclosed in Ser. No. 116,952, with the improvement enabling numbers of such electrodes to be assembled electrically in series, so that batteries of increased voltage can be made.

This as well as other objects which will become apparent in the discussion that follows are achieved, according to the present invention, by a gas diffusion electrode for an electrochemical cell having an acidic electrolyte, comprising a metal net, a corrosion-resistant, electrolyte- and gas-impervious, graphite-foam coating on the net, sunken canal means on the graphite-foam coating for conducting electrolyte, a porous catalyzing layer conforming with the net and in contact with the graphite-foam coating, and an electrically insulating coating on the graphite-foam coating.

DESCRIPTION OF THE PREFERRED EMBODIMENTS

The objects of the present invention are achieved by providing electrolyte canals sunk into the graphite-foam coating of the electrode disclosed in Ser. No. 116,952 and by providing on the graphite coating a coating of an electrically insulating material. Otherwise, the structure and manner of making the electrode of the present invention are fundamentally the same as in the case of the electrode disclosed in Ser. No. 116,952; therefore, the disclosure of Ser. No. 116,952 is incorporated here by reference.

Figure 1:
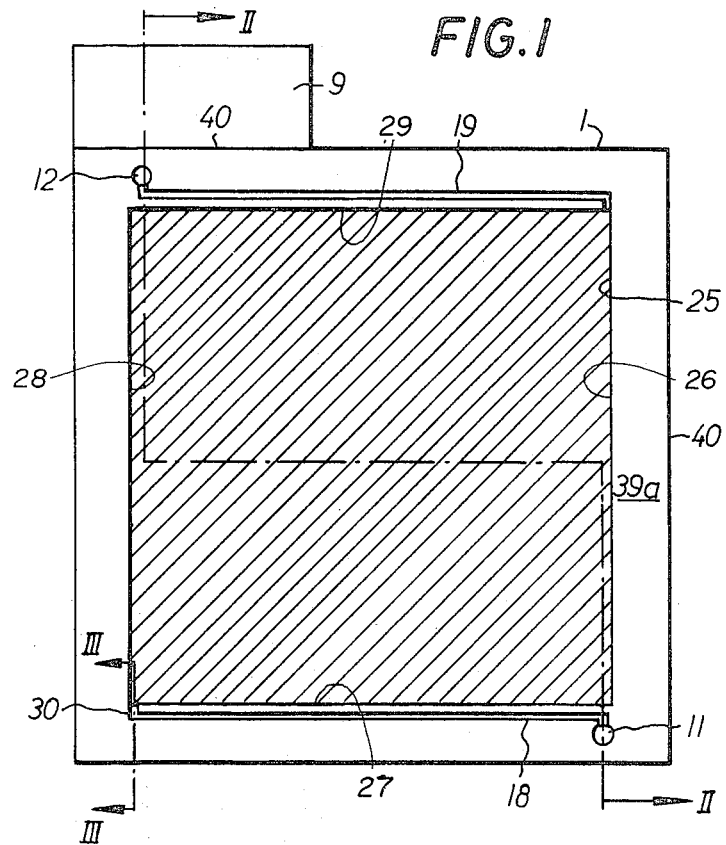
FIG. 1 is a view looking at the right side of the battery in FIG. 2.
Figure 3:
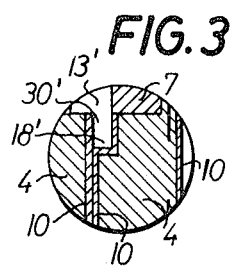
FIG. 3 is a detail view on a portion of the cutting plane III—III of FIG. 1.
Figure 2:
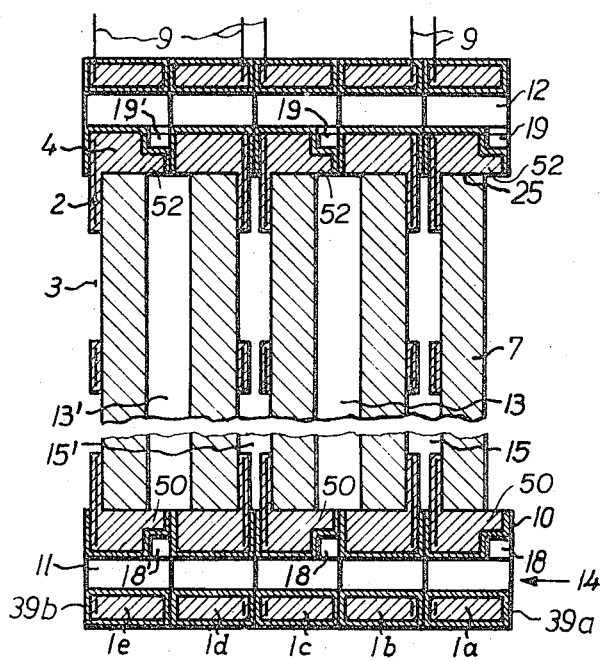
FIG. 2 is a view along the cutting plane II—II of FIG. 1.

Referring now to the FIGS. 1–3, these illustrate one embodiment of the invention and are schematic in part. Each electrode 1 includes a steel net 2, for example Cr/Ni 17/7 steel as set forth in Ser. No. 116,952, having holes 3. A front view of holes 3 would be as provided in FIG. 3 of Ser. No. 116,952. Holes 3 may be produced by piercing, as described in Ser. No. 116,952. The steel net is completely encased by a coating of corrosion-resistant graphite foam 4. Exemplary details concerning a suitable graphite-foam coating are set forth in Ser. No. 116,952. The graphite coating includes a frame portion, the inner wall 25 of which forms with the remainder of the coating a recessed region where the electrochemically active catalyst, layer 7, sits, conforming with the net 2 and in contact with the graphite-foam coating 4. Inner wall 25 includes four inner wall segments, 26, 27, 28 and 29 as best seen in FIG. 1. The frame portion has on one of its sides two spaced apart lateral extensions 50 and 52, best seen in FIG. 2, which are in contact with the top and bottom walls of catalyst layer 7 and extend past one side of catalyst layer 7. The catalyst can be, for example, a mixture of tungsten carbide, activated carbon, and polyethylene sintered in place under appropriate pressure, time, and temperature as set forth in Example I of the U.S. Pat. application of Harald Böhm et al, Ser. No. 880,898, filed Nov. 28th, 1969, for an "Electrode Material."

Protrusions 9 are extensions of net 2 and provide surfaces from which electrical current or voltage can be withdrawn by means, for instance, of alligator clips.

According to the present invention, each electrode 1 is provided with grooves forming electrolyte canals 18 and 19 and with a coating 10 of electrically insulating material for preventing electrical contact between the electrolyte and the graphite coating. In the particular embodiment shown, electrical contact between electrolyte and graphite coating does occur to a small extent on the inner wall 25, but this is insignificant for obtaining the objects of the present invention.

The canals 18 and 19 can be formed in the graphite-foam coating by any suitable pressing tool. Canals 11 and 12 are the main electrolyte canals; they extend through an entire assembled battery, as shown in FIG. 2. The electrolyte comes in, for example, at the entrance 14 of main canal 11, branches out into the electrolyte canals 18 and 18', moves into electrolyte chambers 13 and 13' through necks 30 and 30' (FIG. 3), emerges from the electrolyte chambers into electrolyte canals 19 and 19', and then joins again to leave through the outlet main canal 12.

The narrow electrolyte canals 18 and 19 of the electrodes measure, in a preferred example, 120 millimeters in length, 0.5 millimeters in width, and 1 millimeter in depth. Such narrow electrolyte canals provide paths of high resistance, so that the total battery voltage falls in steps along these canals. This means that the decomposition voltage of the water in an aqueous electrolyte is never reached, thus preventing electrolysis.

The continuous coating 10 of electrically insulating material on the graphite-foam coating 4, including the walls of electrolyte canals 18 and 19, is, for example, silicone rubber. This rubber is acid-resistant, elastic, and usuable at temperatures up to 150°C. The thickness of the coating 10 lies, in a preferred example, at from 0.1 to 0.3 millimeters.

FIG. 2 shows in particular the assembly of a plurality of electrodes of the invention into a battery. As may be seen, the electrodes are arranged relative to one another like the leaves of a book. Neighboring electrodes are in mutual abutment, with contact between neighboring electrodes being along continuous, mutually opposed, insulating-material-coated promontories 39a and 39b of the graphite-foam coating. Electrode 1a, coated with insulating material 10, abuts directly on electrode 1b, likewise coated with insulating material 10; the insulating material provides a sealing between neighboring electrodes, due to the fact that the promontories are continuous around the perimeter 40 of each electrode. Sealing contact is obtained in the embodiment shown, because the surfaces of the promontories are planar, but other surface topographies are possible, as long as they mate with the topographies of neighboring electrodes. The electrodes can thus be assembled into a battery without providing any special sealing means other than coatings 10. Both electrodes, 1a and 1b, form a gas chamber 15, for which no special sealing is needed, because of the presence of coatings 10 of insulating material. Electrode 1b has no electrolyte canals 18 and 19 and serves to close off the open sides of canals 18 and 19 in insulating-material-coated electrode 1c immediately following electrode 1b. Electrodes 1b and 1c together form the electrolyte chamber 13. Directly abutting on the opposite side of electrode 1c is electrode 1d; electrodes 1c and 1d form gas chamber 15'. Following electrode 1d is another electrode 1e, likewise coated with insulating material 10. The electrolyte canals 18 and 19 of electrode 1e are sealed off by electrode 1d. Electrodes 1d and 1e together form electrolyte chamber 13'.

As is evident from the Figures, canals 18 and 19 are sunk into promontory 39a in the embodiment shown. When a planar promontory 39a containing canals 18 and 19 is placed in abutment with a planar promontory 39b of a neighboring electrode, an automatic closing and sealing of the canals is obtained due to the presence of silicone rubber coatings 10 on the promontories. As noted above, it is of advantage that the canals 18 and 19 present a significant resistance path, and, in the embodiment shown, the canals have a length approximately equal to at least one-fourth of the length of an electrode perimeter.

The electrodes 1c and 1d are $O_2$-electrodes. Layer 7 for the $O_2$-electrodes can have, for example, the composition provided for cathode 3 in Example I of the U.S. Pat. application of Harald Böhm et al., Ser. No. 125,735, filed Mar. 18th, 1971, for a "Bipolar Electrode," referred to in the following as "Ser. No. 125,735."This composition may be sintered in place under appropriate pressure, time, and temperature as set forth in Ser. No 125,735. The electrodes 1a, 1b, and 1e are $H_2$-electrodes containing, for example, tungsten carbide-based catalyst as explained above. Suitable electrolyte is 2-normal $H_2SO_4$.

In making the graphite coating with its frame portion, the two grooves forming the electrolyte canals 18 and 19 are pressed by appropriate mold contouring at the same time into the graphite foam. Pressing of the graphite foam onto net 2 and the forming of the grooves is done simultaneously at $10^6$ ponds/cm² at room temperature. Subsequently, the net and its graphite foam coating are immersed, for example, into a bath of the silicone rubber in liquid form. Upon being removed, the net and graphite coating have acquired a coating of the silicone rubber and the rubber coating is then cured in place. Instead of an immersion process, a spray process can be used.

Rather than pressing and sintering layers 7 in place, an alternative process is to form layers 7 elsewhere and impregnate the graphite-foam coating by dipping it into a saturated solution of polyethylene in toluence at a temperature of 100°C. After cooling and drying the graphite-foam coating, it is assembled with a previously formed anode or cathode layer 7, as the case may be, and held under a pressure of $10^5$ ponds/cm² and a temperature of 150°C for 30 minutes. The 150°C temperature does not harm the silicone rubber coating. By this procedure, layer 7 becomes tightly bonded to the graphite-foam coating by the polyethylene of the layer 7 joining that of the graphite coating. A good electrical conductivity is attained by the conductive particles pushing through the polyethylene film between the graphite and the layer 7.

The advantages achieved with the present invention lie especially in the fact that the provision of electrically insulated electrolyte canals in the electrically conductive graphite-foam coating of the electrode makes it possible to obtain a series connection of the individual cells of a fuel cell battery. Before, special sealing entities were required for forming the gas and electrolyte chambers; sealing is accomplished in the present invention by a coating 10 of insulating material, which is applied in appropriate thickness on the graphite coating, particularly in the area of its frame portion. This provides a significantly simpler assembly for the electrodes of the present invention when they are put together to form fuel cell batteries. One simply lays the mutually electrically insulated electrodes together, like the leaves of a book, and no separate insulating entities are needed.

It will be understood that the above description of the present invention is susceptible to various modifications, changes and adaptations, and the same are intended to be comprehended within the meaning and range of equivalents of the appended claims.

We claim:

1. A gas diffusion electrode for an electrochemical cell having a acidic electrolyte and in which cell the gas diffusion electrode contacts an abutting electrode comprising:
   a. a metal net;
   b. a corrosion resistant, electrolyte-and gas-impervious, graphite foam coating encasing said net, said foam coating having a frame having on one side two spaced apart, lateral extensions;
   c. a porous catalyzing layer having a first side defining one side of a gas chamber, a second side defining one side of an electrolyte chamber, a top wall and a bottom wall, with said graphite foam coating being in contact with said layer along said first side and the extensions of said coating being in contact with the top and bottom walls of the catalyst layer and extending past the second side of said catalyst layer;
   d. a main electrolyte inlet canal passing through said frame;
   e. a main electrolyte outlet canal passing through said frame;
   f. sunken canal means on one of said two spaced apart lateral extensions of the frame of the graphite foam coating for conducting electrolyte from the main inlet electrolyte canal to the electrolyte chamber defined by said second side of said catalyst layer;
   g. sunken canal means on the other of said two spaced apart lateral extensions of the frame of the graphite coating for conducting electrolyte from the electrolyte chamber defined by said second side of said catalyst layer to the main outlet electrolyte canal; and h. an electrically insulating coating on said frame of the graphite-foam coating for preventing electrical contact between the electrolyte and the graphite coating and for preventing electrical contact between the electrode and an abutting electrode.

2. An electrode as claimed in claim 1, wherein said frame has opposing sides for abutting against and mating with an abutting electrode and said electrically insulating coating is continuously present on said opposing sides.

3. An electrode as claimed in claim 1, wherein said canal means include grooves and said electrically insulating coating is continuously present on the surface of said grooves.

4. An electrode as claimed in claim 1, wherein the frame includes four inner walls and said sunken canal means are parallel to and extend substantially the entire length of one of said inner walls.

5. An electrode as claimed in claim 1, said electrically insulating coating being silicone rubber.

6. An electrode as claimed in claim 5, said rubber coating having a thickness of 0.1 to 0.3 millimeters.

7. A electrode as claimed in claim 1, said electrically insulating coating being elastic.

8. An electrode as claimed in claim 3, said grooves extending approximately at least one-fourth of the length of the perimeter of said graphite-foam coating.

9. An electrode as claimed in claim 3, said grooves having a length of 120 millimeters, a width of 0.5 millimeters, and a depth of 1 millimeter.

* * * * *